United States Patent [19]

Smearing

[11] 4,255,277
[45] Mar. 10, 1981

[54] STORAGE STABLE PEROXIDE PASTE COMPOSITION

[75] Inventor: Robert W. Smearing, Scotia, N.Y.

[73] Assignee: General Electric Company, Waterford, N.Y.

[21] Appl. No.: 7,581

[22] Filed: Jan. 29, 1979

[51] Int. Cl.$^3$ .................... C07C 179/10; C11D 3/395; C11D 7/54
[52] U.S. Cl. .................................... 252/186; 252/95; 252/99; 426/539; 568/559
[58] Field of Search ................... 252/186, 95, 99; 568/559; 426/539

[56] References Cited

U.S. PATENT DOCUMENTS

| | | | |
|---|---|---|---|
| Re. 28,818 | 5/1976 | Eymanns et al. | 252/186 |
| 2,272,576 | 2/1942 | Penn | 568/559 |
| 2,454,254 | 11/1948 | Kuoch et al. | 568/559 |
| 3,324,040 | 6/1967 | Spoor | 252/186 |
| 3,520,825 | 7/1970 | Koehler et al. | 252/426 |
| 3,723,336 | 3/1973 | Eymanns et al. | 252/186 |
| 3,731,791 | 5/1973 | Fourcade et al. | 206/47 A |
| 3,957,683 | 5/1976 | Hittmair et al. | 252/428 |

*Primary Examiner*—Benjamin R. Padgett
*Assistant Examiner*—Irwin Gluck
*Attorney, Agent, or Firm*—Morgan, Finnegan, Pine, Foley & Lee

[57] ABSTRACT

A stable and non-separating catalyst paste comprising a diacyl peroxide; a minor proportion of water; a finely divided calcium carbonate in an amount sufficient to prevent the composition from physically separating into its components; the remainder, if any, being a chemically inert plasticizer.

9 Claims, No Drawings

STORAGE STABLE PEROXIDE PASTE COMPOSITION

This invention relates to storage stable peroxide pastes. More particularly it relates to pastes comprising a peroxide, a minor proportion of water, a finely divided calcium carbonate in an amount sufficient to prevent separation of the paste during storage, and, optionally, an inert plasticizer.

BACKGROUND OF THE INVENTION

Benzoyl peroxide and its derivatives form a family of useful initiators used widely in the polymer and plastics industry. For example, such peroxides catalyze the polymerization of styrene, vinyl chloride, and the like, and the cross-linking of unsaturated polyester compositions. Dry peroxides of this family are shock sensitive and flammable. If a small amount of water is added, e.g., up to 30% by weight, the granules will remain free-flowing and solid and the safety hazards are substantially reduced. It is also possible to add inert plasticizers to reduce the danger in handling and commercial pastes comprising 50 or 55% by weight of the peroxide in tricresyl phosphate or in phthalate esters are now widely available; these can contain up to 15% by weight of water, too. See, generally, U.S. Pat. Nos. 2,454,254; 3,324,040; 3,520,825; 3,957,683. A common problem with peroxide pastes is their tendency to separate physically into their components during storage.

In U.S. Pat. No. Re. 28,818, it is proposed to stabilize such compositions by adding a small, effective amount of an expensive hydrophobic alkyl group-containing silica. Unfortunately, such compositions, while non-separating, must be very carefully prepared or they will either be non-pourable or pasty. They can, therefore, be difficult to pump and package, on the one hand, and not amenable to easy mixing with curable polyester compositions, on the other. In U.S. Pat. No. 3,731,791, creamy catalyst pastes are described comprising benzoyl peroxide, dimethyl phthalate, ground calcite ($CaCO_3$) passing a 300 mesh B.S. sieve and the plasticizer, di-2-ethylhexyl phthalate. These patents are all incorporated herein by reference.

A system has now been discovered whereby a highly plasticized peroxide paste can be made stable, non-separating, pumpable and mixable. Moreover, the paste, which is based on the use of a minor proportion of water added alone or in combination with a plasticizer has a unique, very creamy texture.

DESCRIPTION OF THE INVENTION

According to the present invention, in its broadest aspects, there are provided storage stable paste compositions comprising
 (a) benzoyl peroxide or benzoyl peroxide having one or more substituents selected from halogen, lower alkyl or lower alkoxy;
 (b) a minor proportion of water;
 (c) finely divided particulate calcium carbonate in an amount sufficient to prevent the composition from physically separating into its components; and
 (d) the remainder, if any, being a chemically inert plasticizer.

With respect to peroxide component (a), the compounds are readily made and many are available commercially. The term "(lower)alkyl" and "(lower) alkoxy" refers to groups having from 1 to 6 carbon atoms. "Halogen" includes chlorine and bromine. Illustrative peroxides are benzoyl peroxide, di(2,4-dichlorobenzoyl)peroxide, di(p-methoxybenzoyl)peroxide, di(p-chlorobenzoyl)peroxide, and the like. Preferably, the peroxide component is benzoyl peroxide.

Component (b), water, is essential. In general, readily available commercial peroxides are prepared by crystallization from water and thus contain from trace amounts, up to about 15% by weight of water. In any case, more water is added when making the present compositions, e.g., up to about 36% total.

Component (c) is required to be a finely divided particulate form of calcium carbonate. The calcium carbonate can comprise a ground form of limestone or it can be a precipitated form. Both, are crystalline, the precipitated form being somewhat less dense, and having a much smaller particle size. The particle size of the calcium carbonate should be below about 30 microns and, especially preferably, below about 1.50 microns (ASTM D 1366-55T). Suitable commercial forms of ground calcium carbonate are available from Pfizer, Inc. under the trademark VICRON, and a suitable form of precipitated calcium carbonate is sold by Pfizer under the trademark ALBAGLOS.

Any conventional plasticizer can be present as optional component (d). These are well known and described in the abovementioned patents. They can be added as such or can be added in combination with the peroxide. In general, any plasticizer will be chemically inert to and be capable of softening the solid peroxide particles. Any plasticizer illustratively will comprise an ester of an inorganic or organic polybasic acid, e.g., a phosphate, a phthalate, an isophthalate, a trimellitate, a citrate, a glutarate, or a adipate ester. Typically, any plasticizer will be triphenyl phosphate, tricresyl phosphate, dimethyl phthalate, diethyl phthalate, dibutyl phthalate, diisobutyl phthalate, dioctyl phthalate, dinonyl phthalate, ditridecyl phthalate, dibenzyl isophthalate, butyl benzyl phthalate, diisooctylisophthalate, decyl benzyl isophthalate, triethyl trimellitate, trioctyl trimesate, dicyclohexyl isophthalate, dimethyl glutyrate, dimethyl adipate, triisoctyl citrate, and the like. Preferably, plasticizer component (d) comprises a phthalate, particularly butyl benzyl phthalate, diisobutyl phthalate, diethyl phthalate, dibutyl phthalate, or a mixture of any of the foregoing.

The compositions according to this invention are obtained by mixing in a suitable mixer the peroxide with water and, optionally, plasticizer and the finely divided calcium carbonate, for a time sufficient to obtain a homogeneous mixture.

The ratio of ingredients can be varied over a rather broad range, easily determined by trial and error, so long as the final product has a "whipped cream-like" consistency.

For illustrative purposes, from 10 to 60 parts of peroxide (a) can be mixed with from 2 to 36 parts of water and then there can be added up to 40 parts of calcium carbonate, the balance being, for example, butyl benzyl phthalate (100 parts total of (a) (b) (c) and (d)). Preferably, per 100 parts, (a) will comprise 15 to 25 parts, (b) from 4 to 36 parts, (c) from 30 to 40 parts and (d), if any, the balance. Especially, preferred ratios will be exemplified in detail hereinafter.

As has been mentioned, the catalyst pastes have many uses. The present pastes are very useful as components in mine bolt resin capsules, which are two compartmented packages, one of which contains the catalyst and the other a cross-linkable polyester resin composition. The paste can be filled readily as part of the packaging process because it is easy to pump, and the filled packages are superior to previous systems because the creamy catalyst mixes readily into the resin when the capsule is deliberately broken during application.

DESCRIPTION OF THE PREFERRED EMBODIMENTS

The following examples illustrate the present invention. They are not to be construed to limit the claims in any manner whatsoever.

EXAMPLE 1

To 40 parts by weight of a paste of 50% benzoyl peroxide in butyl benzyl phthalate, dibutyl phthalate or diisobutyl phthalate plasticizer containing 15.0% water (Witco's BZQ-50 or Noury's BEP-50) is added up to an additional 25 parts of water. Then up to 20 parts of diisobutyl phthalate, dibutyl phthalate or butyl benzyl phthalate is added. After mixing, the system is extremely fluid. To this is added 35 parts of precipitated calcium carbonate (Pfizer's Albaglos), and mixing is continued until a very creamy texture is obtained.

EXAMPLE 2

To 25 parts of water containing a trace of Tergitol XD surfactant in a clean vessel is added 40 parts by weight of a paste of 50% benzoyl peroxide in phthalate plasticizer, in increments, blending for one minute with a high shear mixer set at slow speed after each addition. Then about 17 parts of ground calcium carbonate (Pfizer VICRON 41-8) is added and the mix is blended until uniform. The mixer speed is increased to maximum and the remainder, 18 parts, of ground limestone is added as fast possible, and the mix is blended until uniform. The creamy paste is packaged and stored at 32°-80° F.

The resulting pastes are (i) non-settling over a long period of time; (ii) easy to pump and do not cause wear to packaging equipment; and (iii) readily mix with cross-linkable polyester resin compositions.

It is obvious that many variations are possible in light of the above, detailed description. All such variations are within the full intended scope of the appended claims.

I claim:

1. A storage stable peroxide paste composition comprising:
   (a) benzoyl peroxide or benzoyl peroxide having one or more substituents selected from halogen, lower alkyl or lower alkoxy;
   (b) a minor proportion of water; and
   (c) finely divided particulate calcium carbonate in an amount sufficient to prevent the composition from physically separating into its components.

2. A composition as defined in claim 1 wherein component (a) comprises 10 to 60 parts; and component (b) comprises 2 to 16 parts by weight per 100 parts by weight of (a), (b), and (c) combined.

3. A composition as defined in claim 1 wherein component (a) is benzoyl peroxide.

4. A composition as defined in claim 1 containing a chemically inert plasticizer.

5. A composition as defined in claim 4 wherein the plasticizer comprises a phosphate, a phthalate, an isophthalate, a trimellitate, a citrate, a glutarate, or an adipate ester.

6. A storage stable peroxide paste composition comprising per 100 parts by weight:
   (a) from 15 to 25 parts by weight of benzoyl peroxide;
   (b) from 4 to 36 parts by weight of water; and
   (c) from 30 to 40 parts by weight of finely divided calcium carbonate.

7. A composition as defined in claim 6 wherein component (c) has a particle size of below 1.5 microns.

8. A composition as defined in claim 6 which comprises a phthalate plasticizer.

9. A composition as defined in claim 6 which comprises butyl benzyl phthalate, diisobutyl phthalate, diethyl phthalate, dibutyl phthalate, dimethyl phthalate or a mixture of any of the foregoing.

* * * * *